United States Patent
Backman et al.

(10) Patent No.: US 9,068,072 B2
(45) Date of Patent: Jun. 30, 2015

(54) CPVC PIPE WITH 25% HIGHER HYDROSTATIC DESIGN BASIS THAN REQUIRED UNDER ASTM D2846

(75) Inventors: Arthur L. Backman, Broadview Heights, OH (US); Rocco A. Mango, Avon Lake, OH (US); Robert S. Newby, Hudson, OH (US); Andrew M. Olah, Spencer, OH (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 751 days.

(21) Appl. No.: 12/260,400

(22) Filed: Oct. 29, 2008

(65) Prior Publication Data

US 2009/0110858 A1 Apr. 30, 2009

Related U.S. Application Data

(60) Provisional application No. 60/983,322, filed on Oct. 29, 2007, provisional application No. 61/041,023, filed on Mar. 31, 2008.

(51) Int. Cl.
| | |
|---|---|
| *B32B 1/08* | (2006.01) |
| *F16L 9/12* | (2006.01) |
| *F16L 9/127* | (2006.01) |
| *C08L 55/02* | (2006.01) |
| *C08L 27/24* | (2006.01) |
| *C08L 51/04* | (2006.01) |
| *C08L 55/00* | (2006.01) |
| *C08K 5/57* | (2006.01) |

(52) U.S. Cl.
CPC .................. *C08L 55/02* (2013.01); *C08L 27/24* (2013.01); *C08L 51/04* (2013.01); *C08L 55/00* (2013.01); *C08K 5/57* (2013.01)

(58) Field of Classification Search
CPC ............ C08L 2666/02; C08L 2666/04; C08L 2666/24; C08L 27/24; C08L 51/04; C08K 5/57; F16L 9/127; F16L 9/12; F16L 11/06
USPC ................ 428/36.9, 36.92; 138/177; 524/178
See application file for complete search history.

(56) References Cited

U.S. PATENT DOCUMENTS

| | | | |
|---|---|---|---|
| 2,996,049 | A | 8/1961 | Paul Huska |
| 3,100,762 | A | 8/1963 | Shockney |
| 3,563,974 | A | 2/1971 | Eckardt et al. |
| 4,647,646 | A | 3/1987 | Hardy et al. |
| 5,194,471 | A | 3/1993 | Hartitz |
| 5,591,497 | A | 1/1997 | Hartitz |
| 6,187,868 | B1 | 2/2001 | Backman et al. |
| 6,887,926 | B1* | 5/2005 | Parhar et al. .................. 524/128 |
| 2003/0157321 | A1* | 8/2003 | Dalal et al. .................... 428/369 |
| 2008/0188608 | A1* | 8/2008 | Dalal et al. .................... 524/450 |

FOREIGN PATENT DOCUMENTS

EP 0 921 156 A1 6/1999

OTHER PUBLICATIONS

A letter of Jul. 6, 2010 (two pages) from Kaneka Texas Corporation's legal counsel explaining how the Kaneka KNK-5003 product data sheet and some other information negates patentability of PCT/US2008/081436 (which claims priority from the same U.S. Appl. No. 60/983,322 and U.S. Appl. No. 61/041,023 as the captioned U.S. Appl. No. 12/260,400). Attached to the letter was one page of a CPVC Powder Formulation product code KNK-5003 for use in making pipe products. The data sheet was sent to Applicant by Kaneka's legal counsel and supposedly was dated Jan. 25, 2005.
A letter of Sep. 9, 2010 (two pages) from Kaneka Texas Corporation's legal counsel explaining how the Kaneka KNK-5003 product data sheet and some other information negates patentability of PCT/US2008/081436 (which claims priority from the same U.S. Appl. No. 60/983,322 and U.S. Appl. No. 61/041,023 as the captioned U.S. Appl. No. 12/260,400). Attached are Exhibits A-E.
Internet web page printouts, Jul. 28, 2010, www.nsf.org, NAF Certified Products—Plumbing and Related Products, NSF Product and Service Listings, NSF/ANSI Standard 14 Plastics Piping System Components and Related Materials, pp. 1-2.
The Lubrizol Corporation, Jul. 26, 2010 and Sep. 26, 2008, HDB Verification Testing—180F, Lab testing.
BlazeMaster Fire Sprinkler Systems Product Data Sheet, BlazeMaster 88738, Jun. 2007, 2 pages.
Web site www.astralcpvc.com/astral_pipes.html, Astral Products—Astral FlowGuard CPVC—Pipes, Astral FlowGuard CPVC Hot & Cold Water Plumbing System, Pressure Ratings for CPVC 4120, SDR 13.5 Plastic Pipe, 2007, pp. 1-2.

* cited by examiner

*Primary Examiner* — Gwendolyn Blackwell
*Assistant Examiner* — Yan Lan
(74) *Attorney, Agent, or Firm* — Samuel B. Laferty

(57) ABSTRACT

CPVC pipe in diameters in the range from 15 mm (0.5 inch) to 15.24 cm (6 ins), to carry hot and cold aqueous streams under 690 KPa (100 psi) pressure and 82.2° C. (180° F.) in continuous service, is extruded from a compound in which the CPVC has a high Cl content in the range from 66.5%-70%, when modified with either of two specific impact high rubber modifiers in an amount greater than 5 parts but no more than 6 parts per 100 parts of CPVC. Extruded CPVC pipe provides a HDB measured according to ASTM D2837-01 which is 25% or more greater than that required for commercial pipe as specified in ASTM D2846. As a result, both SDR-11 and SDR-13.5 pipe are produced which provide a HDB of at least 1250 psi (8.62 MPa) at the 100,000 hr intercept.

17 Claims, No Drawings

CPVC PIPE WITH 25% HIGHER HYDROSTATIC DESIGN BASIS THAN REQUIRED UNDER ASTM D2846

CROSS REFERENCE TO RELATED APPLICATIONS

This application claims priority of U.S. Provisional Application Ser. No. 60/983,322 filed on Oct. 29, 2007 and U.S. Provisional Application Ser. No. 61/041,023 filed on Mar. 31, 2008.

FIELD OF THE INVENTION

This invention relates to pipe made by extruding a post-chlorinated polyvinyl chloride (CPVC) compound in which the choice of a narrowly defined high concentration of chlorine (Cl) in the CPVC, in combination with narrowly defined amounts of a specific known impact modifier and other known ingredients, provides a CPVC compound which provides pipe found unexpectedly to exceed a minimum pressure rating required by ASTM D2846. Such higher pressure rating could not be obtained in the best embodiment disclosed in the prior art. The pipe is made from a material which has a high hydrostatic design basis (HDB) of at least 1250 psi, as measured according to ASTM-D2837 at 180° F. The material allows a CPVC pipe to be made with a standard dimension ratio of 13.5 (SDR 13.5) and have a 100 psig pressure rating. Also, an SDR-11 pipe can be made with a 125 psig pressure rating at 180° F.

BACKGROUND OF THE INVENTION

The physical properties of commercially available CPVC pipe are widely extolled and deservedly so. These properties include (a) a high distortion temperature under load (DTUL), also referred to as heat distortion (or deflection) temperature (HDT); (b) ductility at a relatively low temperature; and, (c) a high resistance to rupture (high hoop strength) even when carrying water at 82.2° C. (180° F.) under 690 KPa (100 psig, pounds per square inch gauge) pressure. Combined with the excellent corrosion resistance of CPVC, such properties decreed that the pipe could be used in hot and cold water and other aqueous distribution systems in both industrial and domestic installations where continuous service under these conditions was demanded. By "continuos service" is meant that the pipe is subjected to the aforesaid conditions without interruption over a period of 50 years.

To meet this requirement for continuous service, the CPVC pipe having a most preferred concentration of Cl in the range from 65 wt. % to 69 wt. %, is disclosed in U.S. Pat. No. 5,591,497 (the '497 patent) to Hartitz. The formulated compound is blended with post-chlorinated polyethylene (CPE), an impact modifier, stabilizer, plasticizer, glass transition temperature (Tg) enhancing additive, lubricant, pigment, and the like. As stated in the '497 patent, the amount of "high rubber" impact modifier "comprising a polydiene and one or more hardening monomers" used in the CPVC compound (the mixture to be extruded) has an effect on (i) melt flow rate which affects control of the extrudate, inter alia; (ii) heat distortion temperature; (iii) tensile modulus; (iv) dynamic thermal stability; and (v) weathering. (see col. 1, lines 40-43). A "high rubber" impact modifier is one which contains more than 50 wt. % of a pre-formed rubbery polydiene substrate such as a 1,3-diene polymer or copolymer thereof, in particular of butadiene and/or isoprene, referred to herein as a "polydiene".

The chemical structure and amount of "flow enhancers" used in the CPVC compound has an effect on (i) tensile modulus; (ii) brittleness at low temperature; (iii) tensile strength; and (iv) heat distortion temperature (see col. 1, lines 44-47). In particular, lubricants, both internal (within the extrudate) and external (between the extrudate and the walls of the extrusion die), processing aids and plasticizers, if used, and CPE used in a CPVC compound, each contributes its effect towards flow. The precise function of the CPE is not known, but it is believed to function as a flow enhancer, whether plasticizer, processing aid or lubricant.

The '497 patent provides illustrative examples showing how choice of ingredients in the CPVC compound affects physical properties of pipe made from 68.5% Cl CPVC. But, the patent contains no suggestion that, either the concentration of Cl in the CPVC and the molecular weight (measured as inherent viscosity "I.V.") of the precursor PVC, the concentration of CPE, or the choice of both the type and amount of particular ingredients in a formulated CPVC compound will affect the physical properties of the CPVC pipe extruded. In particular, there is no suggestion that either the Cl concentration of the CPVC and I.V. of the precursor PVC, the concentration of CPE, or the type of impact modifier, inert filler, lubricant and stabilizer, and the amount in which each is used, would make a disproportionately large difference in the physical properties of the pipe, especially as measured by the notched Izod impact strength and hydrostatic design basis "HDB". HDB is the estimated tensile strength in the wall of the pipe in the circumferential orientation that when applied continuously will cause the pipe to rupture or burst at 100,000 hrs. (see ASTM D2837-01). By "inert" is meant that the filler does not react with any of the ingredients of the CPVC compound.

To improve the long term performance and reliability, thus providing a higher degree of safety over continuous use, it was decided to try and modify the formulation of the CPVC compound disclosed in illustrative example 7 of the '497 patent, which example meets the requirements of cell class 2-4-4-4-7, that the new formulation may meet the more stringent requirements of a higher cell class, namely 2-4-4-4-8. The first numeral "2" in the cell class designation specifies CPVC pipe; the second numeral (whether "3" or "4") specifies the level of notched Izod impact strength—"3" indicates at least 80.1 J/m (1.5 ft.lb/in) of notch, "4" indicates at least 266.9 J/m (5 ft.lb/in) of notch; the third numeral "4" specifies tensile strength of at least 48.3 MPa (7,000 psi); the fourth numeral "4" specifies tensile modulus of at least 2482 MPa (360,000 psi); and the fifth numeral (whether "7" or "8") specifies the level of DTUL or HDT measured under 1.82 MPa (264 psi) load. Numeral "7" indicates DTUL or HDT of at least 100° C., and "8" indicates DTUL, or HDT of at least 110° C. (see ASTM D1784).

The '497 patent specifies the high rubber impact modifier as being an "ABS graft copolymer (which) has a Shore D hardness generally less than about 64 and preferably in a range between about 35 and 45, and non-ABS graft copolymer having a Shore D hardness between 35 and less than 42" (see col. 4, lines 2-5) indicating that there is nothing critical about either the type of graft, or the hardness of the high rubber impact modifier chosen. The acronym "ABS" refers to styrene and acrylonitrile grafted on a polydiene-containing backbone.

Illustrative examples 1, 2, 6 & 7 of the '497 patent do not identify the impact modifier used beyond stating that it is an "ABS graft copolymer with a Shore D hardness of 44" (Exs. 1, 2 and 7), or "with a Shore D hardness of 64" (Ex. 6). Example 5 substitutes 7 parts of a Shore D 42 MBS graft copolymer for the ABS impact modifier. The acronym "MBS" refers to methylmethacrylate and styrene grafted on a polybutadiene or styrene-butadiene backbone. Without knowing which of the many commercially available "high rubber" ABS or MBS graft copolymer impact modifiers was used, it is not possible to determine its hardness. Examples 3 and 4 use no impact modifier.

The '497 patent teaches using CPVC with Cl content "preferably between about 65 wt. % and 69 wt. %" but cautions that "where the chlorine content is outside of the specified range, CPVC exhibits characteristics which render it unsuitable in the present invention. Above the maximum specified chlorine level, the compositions derived therefrom would exhibit inadequate processing properties, poor impact properties and inadequate dynamic thermal stability for the intended use". (see col. 4, lines 18-24).

Though the illustrative examples used CPVC with a 68.5 wt. % Cl content, and the most preferred molecular weight range of the precursor PVC was quantified by an inherent viscosity from 0.7 to 1.2, the effect of either the Cl content of the CPVC, or the I.V. of the precursor PVC, on the physical properties of the impact modified CPVC, was not recognized. The 68.5 wt. % Cl content was consistent with the requirement that CPVC pipe for hot and cold water use should be "high Cl" content pipe, to provide a desirable high HDT, the choice of the particular concentration being in the range from 67 wt. %-70 wt. % Cl. Whatever I.V. in the broad range it happened to be, was only coincidental. In particular, there is no suggestion that Cl content would have an effect on either the notched Izod impact strength or the HDB (see ASTM D2837-01); and no suggestion that choice of I.V. in a particular narrow range of at least 0.88, preferably from 0.88-1.05, combined with particular choices of filler and its particle size, the concentration of CPE having specified Cl content, and a high rubber impact modifier, would have a very large effect on either the notched Izod impact strength or the HDB, or both.

Referring to a "high-strength blend of CPVC and styrene-acrylonitrile (SAN) copolymer having a chlorine content between 60.5 wt. % and 64.5 wt. %", disclosed in U.S. Pat. No. 4,647,646, the '497 patent states: "The blend exhibits improved tensile strength, however a particularly high tensile strength in the absence of improved impact resistance and in particular, an absence of low temperature ductility is not useful for hot and cold water distribution system (HCWD) components such as plumbing pipes and fittings or in drain-waste-vent systems. A combination of properties is required. Upon impact modification of this blend, a loss in HDT and modulus, is predicted". (see '497, col. 2, lines 33-42). The observation that "impact modification" of the "low Cl" compound was predicted to result in a loss of HDT and modulus, does not indicate whether the amount of modifier used was either increased or decreased. Nor is there any indication how the Cl content of the CPVC, particularly if it was above 67 wt. %, might affect the properties imparted by the modifier, if at all, irrespective of its chemical structure or the amount used. Indicating that the tensile strength was improved in CPVC with a Cl content lower than 64.5 wt. % does not suggest the HDB would also be increased, as the HDB is a measure of the strength of the pipe, not its tensile strength.

The CPVC pipe currently sold meets the cell classification requirements of ASTM D2846 as outlined in ASTM D1784, as it must, by choosing the appropriate mixture of ingredients in the CPVC compound. The difficulty of doing so, despite knowing that the properties of the extrudate will be affected by both the chemical structure and the amount of each key ingredient (identified in the '497 patent as being the flow enhancer, and, the impact modifier), is set forth in six of the seven illustrative examples of the '497 patent.

In each of the examples of the '497 patent, long term hydrostatic stress rupture (LTHS) testing was conducted for only between about 190 hr and 600 hr at 82.2° C. (180° F.), but there is no indication under what specific pressures the test was conducted (see col. 9, lines 55-59). Yet, the extrapolation is stated "to predict the 100,000 hour intercept value". The requirement for arriving at a predicted HDB is specified in ASTM D2837-01; the minimum testing time for each of several samples is 10,000 hr under sequential pressures at 82.2° C. (180° F.). In view of this strict requirement, it is not reasonable to accept the prediction made from the tests of record. The longest test was run only 6% of the test period specified by the ASTM test (test run for between 190 hr and 600 hr instead of 10,000 hr). The 100,000 hr intercepts predicted in each of the examples of the '497 patent are based on data over too short a period of time to be credible though measured values on impact strength would be.

Reference herebelow is to each of seven examples in the '497 patent, in each of which the CPVC compound was formulated with 100 parts by weight of CPVC with a Cl content of 68.5 wt. %, the stated amount of CPE having a Cl content in the range from 30%-40% but of unspecified molecular weight (see '497 col. 1, lines 53-54), 5 parts of titanium dioxide ("pigment") of unspecified particle size, and specified amounts of lubricant, stabilizer and an inadequately identified impact modifier.

The disclosure relating to the titanium dioxide used, is silent as to its particle size and no hint of its critical effect on impact strength and HDB. There is no mention of the use of an antioxidant which is found useful to maintain the desired physical properties at the extrusion temperature of "high Cl" CPVC pipe in the range from 200° C.-225° C.

Referring to the 100,000 hr intercept, the '497 states: "A ¾ inch (19 mm) standard dimension ratio 11 (SDR-11), copper tube size (cts) (copper tubing specifications), pipe extruded directly from a powder composition exhibited an unexpected ductility during low temperature drop impact testing and exceeded the minimum long term hydrostatic stress rupture requirement of ASTM D2846". (see col. 3, lines 55-60).

"SDR" refers to "standard dimensions ratio" defined as: $[D_o/t]$ where "$D_o$" is the average outside diameter, and "t" is the minimum wall thickness.

The pressure rating is determined by the formula:

$$\frac{2 \times HDB \text{ Rating of the Material} \times (\text{safety factor})}{SDR - 1}$$

For an SDR-11 pipe made with CPVC requiring that it have HDB of 1000 psi, and for which the safety factor is 0.5, the pressure rating is:

100 psig=(1000 psi)/(11−1).

If the same SDR-11 pipe is tested with a material that has a HDB of 1250 psi (8.62 MPa), the pressure rating is: (1250 psi)/(11-1)=125 psig, that is, 25% higher than with a material that has a HDB of 1000 psi. The safety factor, also known as service design factor, is specified in TR-9/2002 of the Plastic Pipe Institute (PPI). The safety factor for CPVC water pipes is specified as 0.5 by PPI for calculating pressure rating of the pipe. Thus, the safety factor used in this specification and claims is 0.5 in all examples. Should the safety factor be changed in the future by the applicable standards organization, then the pressure rating of the pipe would change according to the formula above.

The credibility of using measurements which were made between about 190 hr and 600 hr at 82.2° C. (180° F.), coupled with there being no indication under what specific sequential pressures the tests were conducted (see col. 9, lines 55-59), were evidently not an issue in the '497 patent since the aim in the illustrative examples appears to have been not to meet or exceed the minimum HDB requirement of 1000 psi (6.89 MPa) at a 100,000 hr intercept, as specified by ASTM D2846, but only to obtain an approximate indication of the long term hydrostatic stress rupture (LTHS).

In each of the following examples from the '497 patent, the compound consisting essentially of 100 parts 68.5 wt. % Cl and blended ingredients was both, formed into plaques for testing, and conventionally extruded into 19 mm (¾") SDR-11 pipe. The I.V. of the precursor PVC from which the 68.5 wt. % CPVC was made is 0.90.

In Example 1 of the '497 patent, the CPVC was extruded with 9 parts of an impact modifier, namely an "ABS graft copolymer having a Shore D hardness of 44", presumably a graft copolymer of styrene and acrylonitrile on polybutadiene, (see col. 6, lines 28-30), 2.2 parts lubricant (polyethylene "PE" and polyethylene oxide "PEO", see col. 7, lines 39-40), and 5 parts of titanium dioxide (referred to as pigment, see col. 7, lines 60-61), is used. There is no indication of the particle size of the titanium dioxide. This combination of lubricant and titanium dioxide is used in all the examples. The compound resulted in a plaque which had a notched Izod impact strength of 9.5 ft.lb/in of notch (507.1 J/m of notch), the tensile modulus was 342,200 psig (2,359 MPa) and the tensile strength was 7,745 psi (53.39 MPa). The pipe indicated a predicted 100,000 hr intercept of 1,242 psi (8.562 MPa). Though the impact strength and 100,000 hr intercept appear to be excellent, the pipe fails to meet the minimum tensile modulus required by ASTM D-2846.

Note that, since measurements in the '497 patent were made over a period of between about 190 hr and 600 hr at 82.2° C. (180° F.) (see col. 9, lines 55-59) neither this Example 1, nor any of the other examples refers to the 100, 000 hr intercept predicting a HDB value as specified in ASTM D2837-01.

In Example 2 of the '497 patent, the CPVC was extruded with 7 parts of the same impact modifier as that used in Example 1. The decrease of 2 parts of modifier resulted in a tensile strength of 8,088 psi (5.575 MPa); a tensile modulus of 390,800 psi (2,694 MPa); the drop impact strength of 34.9 ft.lb (47.3 N-m) does not state how it was measured. The compound exhibited poor processing characteristics and was deemed unsuitable for extrusion. The predicted 100,000 hr intercept was 1,365 psi (9.410 MPa).

In Example 3 of the '497 patent, the CPVC was extruded with 9 parts of CPE and no impact modifier, other ingredients being the same. The result was a plaque with tensile strength of 7,956 psi (54.84 MPa), a tensile modulus of 346,000 psi (2,385 MPa) which was an increase relative to Example 1, and an Izod impact of 1.9 ft.lb/in (101.4 J/m) which was lower than in Examples 1 and 2. The drop impact strength was 21.1 ft.lb. (28.6 N-m), but how it was measured is not stated. The predicted 100,000 hr intercept of only 161 psi (1.09 MPa), indicates that the concentration of CPE has a large effect on the burst strength of the pipe.

In Example 4 of the '497 patent, the CPVC was extruded with 2 parts of CPE and no impact modifier, other ingredients being the same. The result was a plaque with tensile strength of 8678 psi (59.82 MPa), and a tensile modulus of 393,000 psi (2,709 MPa). The notched Izod impact strength was 0.7 ft.lb/in of notch (37.36 J/m of notch). The drop impact value was 5 ft.lb. (6.7 N-m) (how tested, or the ASTM test used, is not stated); the ductility at 40° F. (4.4° C.) was 12 ft.lb. (16.25 N-m). The compound failed ductility tests required. The pipe fails to meet the requirements of ASTM D2846. The 100,000 hr. intercept was 535 psi (3.688 MPa).

In Example 5 of the '497 patent, the CPVC was extruded with 2 parts of CPE and 7 parts of methacrylate butadiene styrene (MBS) impact modifier, Shore D 42, other ingredients being the same. MBS resins are defined as "graft copolymers of methylmethacrylate and styrene grafted on polybutadiene or styrene-butadiene rubbers" ('497, col. 6, lines 34-36). The result was a plaque with HDT of 99° C.; tensile strength of 8,089 psi (55.76 MPa); a tensile modulus of 360,600 psi (2,485 MPa); and a notched Izod impact strength of 7.7 ft.lb/in of notch (411 J/m of notch). The 100,000 hr. intercept for the pipe was 1,170 psi (8.06 MPa) (meets ASTM D2846 requirement) but the pipe did not meet the minimum HDT requirement. This particular MBS (non-ABS) impact modifier at 7 parts in combination with CPE at 2 parts is stated to have failed to meet the HDT requirement. It has now been found that such MBS graft copolymer impact modifiers, in the novel preferred CPVC compound, readily meet the HDT requirement specified in the '497 patent.

In Example 6 of the '497 patent, the CPVC was extruded with 2 parts of CPE and 7 parts of an ABS impact modifier, Shore D 64, other ingredients being the same. Varying the chemical structure and hardness of the impact modifier relative to Example 5 gave plaques with HDT of 100° C.; tensile strength of 8,352 psi (57.57 MPa); a tensile modulus of 450, 300 psi (3,104 MPa); and a notched Izod impact strength of 2.0 ft.lb/in of notch (106.7 J/m of notch). The 100,000 hr. intercept for the pipe was 1,306 psi (9.003 MPa) (meets ASTM D2846 requirement) but its cold temperature ductility was unsatisfactory.

Example 7 of the '497 patent provides the best mode of the pipe extruded from a compound including the 100 parts CPVC, 2 parts CPE, and 7 parts impact modifier, namely an "ABS graft copolymer having a Shore D hardness of 44", presumably a graft copolymer of styrene and acrylonitrile on polybutadiene, (see Example 1), other ingredients being the same. The plaques had a HDT of 101° C.; a tensile strength of 7,997 psi (55.13 MPa); a tensile modulus of 363,500 psi (2,505 MPa); and a notched Izod impact strength of 7.7 ft.lb/in of notch (411 J/m of notch). The 100,000 hr. intercept for the pipe was 1,242 psi (8.562 MPa) (exceeds ASTM D2846 requirement); its ductility was satisfactory and met requirements of ASTM D-1784. Note, though, its HDT of 101° C. meets the requirements of cell class 2-4-4-4-7, it does not meet the HDT requirement of cell class 2-4-4-4-8.

Since this Example 7 of the '497 patent presented the best mode, it was decided to repeat the example, as best as the description in the example allows, with a test extending over at least 10,000 hr before obtaining the 100,000 hr intercept. The inventors having now found that the most effective impact modifiers are those specified herein, one of the most effective, namely Blendex® 338 (an ABS graft copolymer) was used to duplicate Example 7 of the '497 patent.

To improve the pipe so that it does meet the HDB requirement of "at least 1250 psi at 100,000 hr" as well as the requirement of cell class 2-4-4-4-8, the concentration of CPE in the CPVC compound was left at 2 parts because this was the concentration used in Example 7, and because it functions mainly as a flow enhancer which at higher concentrations than 3 parts has an adverse effect on burst strength. Based on experimental observation that the effect of one specific commercially available, grafted, "high rubber" ABS graft copolymer impact modifier was not greatly different from another of the same genus having a different graft, it was decided, in the tests run, to choose one, namely the Blendex® 338, and vary only the amount used. Accordingly, Blendex® 338 was used at 6 parts, in combination with 2 parts CPE. The impact modifier has a Shore D hardness of 44, measured at 22° C. (ASTM D2240).

At present, BlazeMaster® CPVC SDR-13.5 pipe in iron pipe size (IPS) is formulated with 4 parts of Blendex® 338 impact modifier per 100 parts of "high Cl content" CPVC in a compound formulated for use in extruded pipe sold for sprinkler systems, to control fire in office and residential buildings, warehouses and other enclosed spaces. This pipe for sprinkler systems was configured as SDR-13.5 to meet the dimension requirements of ASTM F-442 and the pressure requirements of UL-1821 which requires the pipe carry a maximum working pressure of 1.307 MPa (175 psi)@65.5° C. (150° F.). Because the high Cl content provides a desired high HDT which readily meets the requirements of ASTM F-442, and the relatively low temperature requirement is also readily satisfied, there was no concern of greater safety. When the BlazeMaster® pipe was tested under ASTM D2837-01, it met the requirement of an HDB of 1250 psi (8.62 MPa) at 100,000 hr; because pipe for sprinkler systems is not used for domestic and industrial hot and cold water, the BlazeMaster® pipe was not tested under ASTM D2846. However, BlazeMaster® pipe is made from a material that does not meet a cell class of at least 2-4-4-4-7.

The Problem:

Though CPVC pipe currently sold meets the cell classification requirements (2-3-4-4-7) of ASTM D2846, the pipe's HDB of 1000 psi (6.89 MPa) at 100,000 hr provides a less than optimal margin of safety for the performance of pipe required to meet a demand for continuous service under stated conditions of elevated pressure, 690 KPa (100 psig), and temperature, 82.2° C. (180° F.), over a period of 50 years. The safety and performance of the pipe are a function of its HDB and notched Izod impact strength. It was decided to try and provide, for users seeking a higher level of performance safety than required under ASTM D2846, CPVC pipe which ensures greater safety and reliability in continuous service than that provided with currently available CPVC pipe. Greater safety and reliability would be provided by pipe in a higher cell class than currently required; which pipe would meet the higher standard of 1250 psi (8.62 MPa) HDB specified in Table 1 of ASTM D2837, preferably, exceed it. More preferably, the pipe would meet the aforesaid higher standard and also have both, a notched Izod impact strength and an annealed HDT higher than provided by a randomly chosen high rubber graft copolymer impact modifier. Annealing a plaque is effected at 100° C. for 24 hr.

If the CPVC compound could be reformulated to provide pipe with a 25% higher pressure rating than required (HDB of 1250 psi vs. HDB 1000 psi), then SDR-11 pipe could provide the higher margin of safety. On the other hand, if the user was satisfied with the margin of safety afforded by the requirements of ASTM D2846, then the user could use SDR-13.5 pipe which, having a thinner wall thickness, would provide higher flow and lower pressure drop than SDR-11 pipe of the same diameter but thicker wall thickness. Also, the SDR-13.5 pipe would be lighter in weight and require less CPVC material to produce the pipe. The lighter weight would make the pipe easier to install and transport.

The Solution:

By dint of laborious trial and error, involving continuous experimentation over several years, the accumulated data from tests presented below indicated an unexpected effect resulting from the combination of what appeared to be only minor changes in the prior art formulation. In particular, it was found that high Cl content CPVC with Cl in the range from 66.5 to 70 wt. %, made from poly (vinyl chloride) polymer (PVC) with a minimum I.V. of 0.88, combined with from 5 phr (parts per 100 parts of CPVC polymer) to 6 phr of particular "high rubber" impact modifiers having specified structure; from 1.25-3 phr of stabilizer, preferably an organotin stabilizer, optionally a co-stabilizer can be used in conjunction with the stabilizer, co-stabilizers such as salts of carboxylic acids, disodium phosphate, sodium citrate, zeolite and hydrotalcite are suitable; from 1.5-3 phr of CPE; and 1-7 phr, preferably 3-5 phr of filler. The filler is preferably either carbon black or titanium dioxide filler having a primary particle diameter in the range from about 0.01 μm to less than 3 μm with about 90% of the particles being in the range from about 0.01 μm to less than 2 μm, preferably from 0.1-1 phr of an antioxidant is used, from 1.3-3.5 phr of a lubricant, and other conventionally used ingredients such as processing aids, and pigments being used in conventional ranges, provided a solution to the problem. Moreover, the effective impact modifier is a graft copolymer which requires that its rubber content be in the range from more than 50% by weight to less than 90% by weight, preferably 60-85% by weight, and when it is a graft copolymer, the graft content is the remainder.

Not only did the CPVC compound reformulated with the critical amount of graft copolymer of acrylonitrile-styrene on a polydiene rubber provide a plaque with a notched Izod impact strength of at least 5 ft.lb/in (266.9 J/m), instead of the required 1.5 ft.lb/in (80.1 J/m), but the plaque and pipe also met all other performance requirements for cell class 2-4-4-4-8 (instead of lower cell class 2-3-4-4-7). In particular, the pipe made from the CPVC compound met the requirement that it have a HDB of at least 1250 psi at the 100,000 hr intercept.

The extrusion compound specified herein is narrowly defined within critical limits, both by the concentration of Cl in the CPVC, and the amount of one or more specific impact modifiers used in combination with other ingredients. The concentration of CPE was kept the same as that in the best mode stated in Example 7 of the '497 patent. Since the concentration of each of the other ingredients is not disclosed in the '497 patent, they are used in the narrow ranges specified below to get the desired results.

The combination of ingredients including using a CPVC with high Cl content and less modifier unexpectedly results in extruded CPVC pipe which has at least a 25% higher HDB as measured according to the requirements of ASTM D2837 than required, and higher impact strength than that obtained with 7 parts by weight of impact modifier; and the novel pipe is qualified in cell class 2-4-4-4-8.

SUMMARY OF THE INVENTION

Though the '497 patent states that CPVC with a Cl content in the most preferred range from 65 wt. % to 69 wt. % is to be used, it is found that when the Cl content is less than 66.5 wt. %, the CPVC formulated with the critical amount of impact modifier specified below, fails to provide a HDB of greater than 1250 psi (8.62 MPa), and fails to qualify the pipe in cell class 2-4-4-4-8. To meet the requirements of cell class 2-4-4-4-8 and at least 1250 psi HDB at the 100,000 hr intercept, the critical Cl content is required to be in the range of 66.5 wt. % to 70 wt. %, it being found that the higher the Cl content the better the HDT, but the more difficult the processing, provided the other ingredients of the compound are included in the amounts stated.

Decreasing the amount of an impact modifier in a CPVC compound will decrease the impact strength (measured by notched Izod impact) and increase the tensile strength of the extrudate, but is not correlatable with HDB. However, it has been found in the preferred embodiment that, by maintaining the CPE content in the range from 1.5 to 3 parts by weight per 100 parts by weight of CPVC polymer, and including only the high rubber impact modifier in a range from 5 to 6 phr, (parts per hundred parts) CPVC in the compound, the extruded pipe meets the HDB of 1250 psi (8.62 MPa) at the 100,000 hr intercept, provided further that the compound includes in the range from 1-7 phr, preferably 3-5 phr of filler, preferably either titania or carbon black in the size range stated above, in combination with from 1.25-3 phr of stabilizer, preferably an organotin stabilizer, optionally a co-stabilizer, and 1.3-3.5 phr of a lubricant. If co-stabilizers are used, it is preferred to use from 0.1 to 1.0 phr, and more preferably from 0.1 to 0.5 phr. As seen in the '497 patent, using 9 parts of CPE (a non-graft copolymer) as impact modifier, fails to provide an acceptable CPVC compound for the desired pipe.

Though the graft copolymer impact modifier specified herein was described in the '497 patent, it was used in too high an amount, even if the remaining ingredients used in the amounts specified herein, were also used.

Moreover, heretofore, the use of other necessary secondary ingredients (CPVC being the primary ingredient) such as filler, stabilizer, processing aid, lubricant, antioxidant and Tg-enhancing additives, in conventionally small amounts, was solely to discharge the particular function of each, and the combined effect on impact strength, HDT and HDB, of either the chemical nature of each particular ingredient, and the amount in which it was used, was given scant consideration.

As a result of the unexpected effect of the combination of high Cl content and critically specified amounts of the particular impact modifier, organotin stabilizer, inert filler and CPE, both, SDR-11 pipe and SDR-13.5 pipe having nominal diameters in the range from ½ inch (15 mm) to 6 ins (15.24 cm) and made from a material having notched Izod impact strength of at least 5 ft.lb/in (266.9 J/m) of notch, and HDB greater than 1250 psi (8.62 MPa) are produced. The SDR-11 pipe provides strength which is at least 25% greater than that of pipe which is only required to meet a HDB of 1000 psi (6.89 MPa) even if it can also meet the requirements of cell class 2-4-4-4-8. For the pipe's continuous use at 100 psig (0.69 MPa) and 180° F. (82.2° C.) over a period of 50 years, now met with pipe in cell class 2-3-4-4-7 and HDB of 1000 psi (6.89 MPa), the novel CPVC compound ensures a larger safety factor than that required. Since the tensile (hoop) strength and burst strength of the pipe is unrelated to whether it is SDR-11 or SDR-13.5, the novel pipe may be produced in either category with the reformulated compound. Extruded SDR-13.5 pipe, with iron pipe specifications (IPS), also meets the requirements for cell class 2-4-4-4-8 in ASTM D1784. In particular, pipe having nominal diameters in the range from 0.5 in (15 mm) to 6 ins (15.24 cm), whether in CTS or IPS and schedules 40 or 80 may now be extruded and provide at least a 25% safety factor above that required.

Having found that small changes in each of the key ingredients of the CPVC compound, in combination, result in unexpectedly large changes in the physical properties of the extruded CPVC pipe, it will be evident that a small change in only one or two of the key ingredients will likely not improve desirable physical properties achieved with a combination of all the small change(s). The HDT properties of the compound used to make the novel pipe specified herein are measured after annealing unless specified otherwise. Except for HDT, all other properties are measured on unannealed samples.

Since pipe as produced is not normally annealed, a sample specimen can be cut from a pipe and annealed to check the properties of the material used to make the pipe. Annealing can be done by exposing the sample to 100° C. for 24 hours. Different times and temperatures can be used to anneal a sample, as long as the internal stresses of the material resulting from processing is relieved. To evaluate the material for HDT properties before it is made into a pipe, the material is first molded into a plaque and a specimen is cut from the plaque and annealed as stated above.

DETAILED DESCRIPTION OF PREFERRED EMBODIMENTS

Because of the normal variations in manufacturing, a SDR-11 pipe might not have an outside diameter that is exactly 11 times the wall thickness and the same is true for a SDR-13.5 pipe. The SDR is determined by dividing the minimum wall thickness into the average O.D. of the pipe, as stated in ASTM D2846. For example, a SDR-11, 1 inch tube has a minimum wall thickness of 0.102 in. (2.59 mm) with a manufacturing tolerance of +0.020 in. (+0.51 mm) and an average outside diameter (O.D.) of 1.125 inches (28.6 mm) with a manufacturing tolerance of ±0.003 in. (±0.08 mm). These numbers are set forth in ASTM D2846 standard. The term "tube" is used in ASTM D2846 when specifying dimensions for CTS size pipe. In this specification and claims the term "pipe" is used and includes the terms tube and pipe as it describes both CTS and IPS sizes. Countries, other than the U.S., may require slightly different standards. Complying with the appropriate standards allow the pipe to be sold with the appropriate SDR designation. The same is true for other SDR size pipes mentioned herein, that is the assigned SDR number is based on recognized standard variations in manufacturing. The CPVC used in the compound:

CPVC having a Cl content in the critical range from 66.5 wt. %-70 wt. %, preferably in the range of from about 67 to 68 wt. %, is derived from poly(vinyl chloride) (PVC) having an I.V. measured as stated in ASTM D1243 of at least 0.88 and preferably in the range from 0.88 to about 1.05. The process for making CPVC from PVC and formulations for CPVC pipe are described in U.S. Pat. Nos. 2,996,049; 3,100,762; 5,194; and 5,591,497 inter alia, the disclosures of which are incorporated by reference thereto as if fully set forth herein. Though the Cl concentration of the CPVC and the I.V. of the precursor PVC are required to be in the aforesaid narrow ranges to meet cell class, neither the density nor the Tg of the CPVC resin to formulate the CPVC compound for the novel pipe is narrowly critical, ranging from 1.56-1.61 g/cc at 25° C., and from 120° C.-150° C. measured by a differential scanning calorimeter (DSC), respectively, as long as the Cl concentration and I.V. remain within the above-stated range. The preferred CPVC composition has at least 80 wt. %, preferably 85 wt. %, and more preferably about 86 wt. %, of the composition as CPVC resin.

The sensitivity of the notched Izod impact strength to the differing chlorine content of two CPVC polymers, each having the same molecular weight (i.e., I.V.), is evidenced in Table 1 below, in which the parts by weight of the ingredients in recipes for two coded batches of CPVC compound are set forth. In the first batch in the first column, the Cl concentration is 67.3 wt. %, while in the second column it is 66 wt. %. Each batch contained 4 parts by weight of submicron (<1 μm) titania particles except for the second batch which also contained 0.16 parts by weight of submicron carbon black particles to provide color for easily visually identifying the plaque made with the slightly lower chlorine concentration.

TABLE 1

Effect of Cl Concentration on Cell Class Properties

| Ingredient | 21980130214111 | 2198007069115 |
|---|---|---|
| CPVC Resin (0.92 IV, 67.3 wt. % Cl) | 100 | — |
| CPVC Resin (0.92 IV, 66 wt. % Cl) | — | 100 |
| Tin Stabilizer | 2.4 | 2.4 |
| Anti-Oxidant | 0.25 | 0.25 |
| Impact Modifier | 6 | 6 |
| Chlorinated Polyethylene | 2 | 3 |
| Titanium Dioxide | 4 | 4 |
| Carbon Black | — | 0.16 |
| Lubricant | 2 | 2 |
| Notched Izod Impact - ASTM D256 (ft-lb/in) | 9.7 | 4.5 |
| Tensile Strength - ASTM D638 (Psi) | 7900 | 7500 |
| Modulus of Elasticity - ASTM D638 (Psi) | 400000 | 368000 |
| HDT (Annealed 24 hrs@ 100° C.) - ASTM D648 (° C.) | 112 | 103 |

The sensitivity of the notched Izod impact strength to the I.V. of two CPVC polymers each having essentially the same Cl concentration of 67.3 wt. %, is evidenced in Table 2 below, in which the parts by weight of the ingredients are set forth as stated above for Table 1. In the first batch in the first column, the I.V. is 0.92, while in the second column, it is 0.79. Each batch contained 4 parts by weight of submicron titania particles except for the second batch which also contained 0.16 parts by weight of submicron carbon black particles to provide color for easily visually identifying the plaque made with the lower I.V.

TABLE 2

Effect of I.V. of CPVC on Cell Class Properties

| Ingredient | 21980130214111 | 2198007061027 |
|---|---|---|
| CPVC Resin (0.92 IV, 67.3 wt. % Cl) | 100 | — |
| CPVC Resin (0.79 IV, 67.3 wt. % Cl) | — | 100 |
| Tin Stabilizer | 2.4 | 2.4 |
| Anti-Oxidant | 0.25 | 0.25 |
| Impact Modifier | 6 | 6 |
| Chlorinated Polyethylene | 2 | 2 |
| Titanium Dioxide | 4 | 4 |
| Carbon Black | — | 0.16 |
| Lubricant | 2 | 2 |
| Notched Izod Impact - ASTM D256 (ft-lb/in) | 9.7 | 4.2 |
| Tensile Strength - ASTM D638 (Psi) | 7900 | 7700 |
| Modulus of Elasticity - ASTM D638 (Psi) | 400000 | 379000 |
| HDT (Annealed 24 hrs@ 100° C.) - ASTM D648 (° C.) | 112 | 111 |

The CPE Used in the Preferred CPVC Compound:

The chlorinated polyethylene (CPE) used is a rubbery material resulting from the chlorination of polyethylene having a substantially linear structure. The polyethylene can be chlorinated by various methods including aqueous suspension, solution or gas phase. An example method for preparing CPE can be found in U.S. Pat. No. 3,563,974. Preferably, the aqueous suspension method is used to form the CPE. Preferably, the CPE contains from 32 wt. % to 40 wt. % by weight of chlorine and has a weight average Mw range between 120,000-400,000 Daltons. It has been found by limiting the CPE content in the range from 1.5 to 3 parts per 100 parts by weight CPVC, the flow enhancing effect is maintained while minimizing the adverse effect on burst strength.

Table 3 below sets forth the parts by weight of the ingredients in recipes for three coded batches of CPVC compound in which the first batch in the first column contained only 1 part of CPE, the other two batches in the second and third columns each containing 2 and 3 parts, respectively. Each batch contained 4 parts of submicron titania particles except for the first batch which also contained 0.16 parts of submicron carbon black particles to provide color for ready visual identification.

TABLE 3

Effect of Concentration of CPE in CPVC

| Ingredient | 2198007069111 | 21980130214111 | 2198013021415 |
|---|---|---|---|
| CPVC Resin (0.92 IV, 67.3 wt. % Cl) | 100 | 100 | 100 |
| Tin Stabilizer | 2.4 | 2.4 | 2.4 |
| Anti-Oxidant | 0.25 | 0.25 | 0.25 |
| Impact Modifier | 6 | 6 | 6 |
| Chlorinated Polyethylene | 1 | 2 | 3 |
| Titanium Dioxide | 4 | 4 | 4 |
| Carbon Black | 0.16 | — | — |
| Lubricant | 2 | 2 | 2 |
| Notched Izod Impact - ASTM D256 (ft-lb/in) | 3.5 | 9.7 | 11.6 |
| Tensile Strength - ASTM D638 (Psi) | 7800 | 7900 | 7700 |
| Modulus of Elasticity - ASTM D638 (Psi) | 383000 | 400000 | 397000 |
| HDT (Annealed 24 hrs@ 100° C.) - ASTM D648 (° C.) | 113 | 112 | 111 |

The "High Rubber" Impact Modifier Used in the Preferred CPVC Compound:

The preferred impact modifiers are ABS or MBS graft copolymers. These specific impact modifiers, in the range from 5 phr to 6 phr, provide higher impact strength and the 1250 psi HDB (8.62 MPa) burst strength which is higher than that purportedly obtained with the unidentified impact modifier used at 7 phr in Ex. 7 of the '497 patent.

ABS modifiers are usually prepared by grafting styrene and acrylonitrile monomers onto polybutadiene rubber or a styrene-butadiene rubber substrates in emulsion. Further information on ABS impact modifiers can be found in the Second Edition of the Encyclopedia of PVC, edited by Leonard I. Nass, Marcel Dekker, Inc. (N.Y. 1988, p. 453-459). Commercially available ABS graft copolymers on polybutadiene rubber include: Blendex® 338 (Chemtura) and Baymod® A52 (Lanxess).

MBS impact modifiers are graft copolymers generally prepared by polymerizing methyl methacrylate or mixtures of methyl methacrylate with other monomers in the presence of polybutadiene or polybutadiene-styrene rubbers. Further information on MBS impact modifiers can be found in the Second Edition of the Encyclopedia of PVC, edited by Leonard I. Nass, Marcel Dekker, Inc. (N.Y. 1988, p. 448-452). Commercially available MBS impact modifiers included Kane Ace® B-564 (Kaneka) and Paraloid® BTA 751U (Rohm and Haas) and Paraloid® BTA 751.

High rubber impact modifiers having a structure other than those described above, used in an amount within the range specified for the ABS and MBS impact modifiers, are found to have an adverse effect on impact properties, as evidenced in the properties set forth in Table 4 below using Paraloid® KM-330.

TABLE 4

Effect of Substituting a High Rubber Acrylic Impact Modifier

| Ingredient | 163113573 |
| --- | --- |
| CPVC Resin (0.92 IV, 67.3 wt. % Cl) | 100 |
| Tin Stabilizer | 2.0 |
| Impact Modifier (high rubber acrylic) | 5 |
| Chlorinated Polyethylene | 4 |
| Titanium Dioxide | 5 |
| Lubricant | 1.5 |
| Notched Izod Impact - ASTM D256 (ft-lb/in) | 1.5 |
| Tensile Strength - ASTM D638 (Psi) | 7940 |
| Modulus of Elasticity - ASTM D638 (Psi) | 353000 |
| HDT - ASTM D648 (° C.) | 108 |

The Stabilizer:

Organotin stabilizers are found most effective, in an amount in the range from 1.25 phr to 3 phr, the amount used depending upon the particular organotin compound chosen. These stabilizers include alkyl tin mercaptides, alkyl tin carboxylate and alkyl tin maleate commercially available as Mark"292, Mark" 292S, and Mark® 17 MOK-A from Chemtura; and stabilizers based on a composition of mono and dialkyl tin (2-ethyl hexyl mercapto acetate) systems, commercially available as Thermolite® 31, Thermolite® 31HF and Thermolite® 890F from Arkema. Optionally, a co-stabilizer in amounts of from 0.1 to 1.0 part by weight and preferably from 0.1 to 0.5 part by weight can be used in conjunction with the stabilizer. Suitable, co-stabilizers include salts of carboxylic acids, disodium phosphate, sodium citrate, zeolite and hydrotalcite. Zeolite is the most preferred co-stabilizer as long as it has small particle size, as described for inert fillers below.

The effect of what appears to be only a slight difference in the amount of stabilizer has a disproportionate adverse effect on notched Izod impact strength, as is evidenced by the data presented below in Table 5 which sets forth the parts by weight of the ingredients in recipes for two coded batches of CPVC compound in which the second batch in the second column contained 1 part of tin stabilizer, the first batch containing 2.4 parts. Each batch contained 4 parts of submicron titania particles except for the second batch which also contained 0.16 parts of submicron carbon black particles to provide visual identification.

TABLE 5

Effect of Concentration of Stabilizer

| Ingredient | 21980130214111 | 2198007069116 |
| --- | --- | --- |
| CPVC Resin (0.92 IV, 67.3 wt. % Cl) | 100 | 100 |
| Tin Stabilizer | 2.4 | 1.0 |
| Anti-Oxidant | 0.25 | 0.25 |
| Impact Modifier | 6 | 6 |
| Chlorinated Polyethylene | 2 | 2 |
| Titanium Dioxide | 4 | 4 |
| Carbon Black | — | 0.16 |
| Lubricant | 2 | 2 |
| Notched Izod Impact - ASTM D256 (ft-lb/in) | 9.7 | 3.9 |
| Tensile Strength - ASTM D638 (Psi) | 7900 | 7600 |
| Modulus of Elasticity - ASTM D638 (Psi) | 400000 | 368400 |
| HDT (Annealed 24 hrs@ 100° C.) - ASTM D648 (° C.) | 112 | 115 |

The Inert Filler:

Inert fillers include any small particle size material which has a primary particle diameter in the range of from about 0.01 µm to less than 3 µm with at least about 90% of the particles by volume %, as measured by laser light scattering being, in the range from about 0.01 µm to less than 2 µm and which does not react with any other ingredient in the CPVC composition. Inert fillers include titania, carbon black, silica, and clay, such as nano clay or montmorillonite. Fillers containing iron compounds should be avoided as the iron can be detrimental to the CPVC. The preferred inert fillers are titania and carbon black, in the amount, and in the particle size range given above, provide pipe in the desired cell class; and when the filler is used with a high rubber graft copolymer impact modifier, the combination also provides the desired HDB. Even a small portion (12.5% by weight) of large particles, based on the total weight of the titania plus zeolite, having a mean particle size of 3 µm, the remaining small particles being in the range from 0.01 µm to 1 µm results in an unacceptably low notched Izod impact strength as seen in the Table 6 below. The amounts listed under each coded batch indicate "parts by weight" of the ingredient in the batch and are expressed as parts by weight per 100 parts by weight of CPVC resin. The titania particles are the small particles; the zeolite particles are the large particles. Other physical properties given below the notched Izod impact strength are essentially unchanged. The small amount of submicron carbon black is added to provide ready visual identification.

TABLE 6

Effect of Particle Size on Cell Class Properties

| Ingredient | 21980130214111 | 2198007061023 |
|---|---|---|
| CPVC Resin (0.92 IV, 67.3 wt. % Cl) | 100 | 100 |
| Tin Stabilizer | 2.4 | 2.4 |
| Anti-Oxidant | 0.25 | 0.25 |
| Impact Modifier | 6 | 6 |
| Chlorinated Polyethylene | 2 | 2 |
| Titanium Dioxide | 4 | 3.5 |
| Carbon Black | — | 0.16 |
| Lubricant | 2 | 2 |
| Zeolite (Mean Particle Size = 3 μm) | 0 | 0.5 |
| Notched Izod Impact - ASTM D256 (ft-lb/in) | 9.7 | 3.8 |
| Tensile Strength - ASTM D638 (Psi) | 7900 | 7500 |
| Modulus of Elasticity - ASTM D638 (Psi) | 400000 | 375000 |
| HDT (Annealed 24 hrs@ 100° C.) - ASTM D648 (° C.) | 112 | 111 |

Other Ingredients in the CPVC Compound:

Having discovered the sensitivity of the impact strength, HDT and HDB of the extruded CPVC pipe to the chemical structure and amount of each secondary ingredient used, one would now expect that varying the chemical structure of the stabilizer and the amount in which it is used, will likely make a difference on both impact strength and HDB. In each case, the novel CPVC compound consists essentially of the combination of the ingredients, in the specified amounts, which combination results in a value reliably above the minimum value of impact strength and HDB required. More preferably, the combination does not result in a value so close to the minimum as to compromise the confidence of one relying on the pipe meeting higher standards than those required of currently produced CPVC pipe.

Antioxidants are helpful in protecting the CPVC composition during processing and service. The antioxidants found most effective (preferred) are hindered phenols.

A hindered phenol is selected from: a polymeric sterically hindered phenol; a 4-methyl-phenol-reaction product with dicyclopentadiene and isobutylene; a butylated reaction product of p-cresol and dicyclopentadiene commercially available as Lowinox® CPL, from Great Lakes Chemical; Wingstay® L from Eliokem, Ralox® LC from DeGussa; and sterically hindered phenolic antioxidants commercially available as Irganox® 1010, Irganox® 1076 from Ciba Specialty Chemicals.

The Lubricant:

Though the amount of lubricant used is best kept in the range specified, the type of lubricant is not narrowly critical. Exemplary lubricants are polyglycerols of di- and trioleates, polyolefins such as polyethylene, polypropylene and oxidized polyolefins such as oxidized polyethylene and high molecular weight waxes.

Other ingredients such as processing aids to improve processability, additives to enhance glass transition temperature (Tg), and pigments for desired coloration, are preferably used in the CPVC pipe compound comprising the specified ingredients, each for a particular reason, with no expectation that the use of such other ingredients will substantially affect both impact strength, HDT and HDB of the extruded pipe. Such other ingredients, well-known in the art, are used in conventionally small amounts, if at all, are well-accepted as not being narrowly critical to either the cell classification or the pressure rating of the extruded pipe.

Though numerous processing aids are disclosed in *The Plastics and Rubber Institute: International Conference on PVC Processing*, Apr. 26-28 (1983), Paper No. 17, preferred are acrylic polymers such as poly(methylacrylate); derivatives of carboxylic acid esters; derivatives of phosphoric acid; terephthalates; derivatives of pentaerythritol and of trimellitic acid.

Plasticizers are disclosed in *The Technology of Plasticizers*, by Sears and Darby, pages 893-1085, John Wiley & Sons, New York, 1982.

Representative Tg enhancing additives include commercially available SAN polymers, PMMA, and various polyimides sold by Rohm and Haas Company under the Paraloid® trademark and variously identified as HT-510, EXL-4151, EXL-4171, EXL-4241 and EXL-4261.

The following ingredients are preferred in the novel CPVC compound and used in the following ranges:

| | |
|---|---|
| CPVC (66.5-70 wt. % Cl) | 100 parts |
| CPE* (32-40 wt. % Cl) | 1.5-3.0 phr |
| Organotin Stabilizer | 1.25-3.0 phr |
| High rubber impact modifier | 5-6 phr |
| Titania/carbon black | 1-7 phr |
| Lubricant | 1.3-3.5 phr |
| Antioxidant | 0.1-1 phr |

*weight average molecular weight of the CPE is in the range from 120,000 to 400,000 Daltons.

The ingredients of the compound are combined and mixed in a Henschel mixer, or ribbon blender and either cubed or left in powder form. Preferably, a powder is fed to either a single, or preferably, a twin screw extruder and extruded at a temperature in the range from 200° C.-225° C. as pipe.

An extruder generally has a conveying means such as a hopper through which the material is charged, an intermediate screw processing portion, and a final die through which the material is discharged in the form of an extrudate. It is further advantageous to use low friction sizing such as gauging discs or vacuum sizing sleeves. The multi-screw extruder is widely used for extrusion of pipe. There are two types of multi-screw extruders: counter-rotating screws and co-rotating screws. Conical twin screw, four screw and parallel twin screws in use are preferably counter-rotating multi-screw extruders. They are generally gravity or meter fed. The co-rotating screws can be used as compounding machines and sometimes for extrusion of pipe. In most cases, output rates are dependent upon the extruder size, drive power and screw design. The machine characteristics applicable to melt process the CPVC composition to make the pipe of the present invention include:

Head pressure rating of at least 7500 psi (51.7 MPa).
Extruder drive/gearbox capable of generating high torque at low rpm.
Vacuum venting to remove volatiles, moisture and entrapped air.
A barrel L/D of at least 16/1.
Temperature controllers able to control within 5° F. or better.
Accurately controllable powder metering screw.

In the following comparison of the novel pipe to the pipe of Example 7 of the '497 patent, only the critical properties of impact strength and burst strength are measured. The burst strength is measured by extrapolating measurements made at ASTM-designated pressures for a total of at least 10,000 hr at 180° F. (82.2° C.) so as to obtain the 100,000 hr intercept as required by ASTM D2846. All other properties were measured to determine in which cell class each CPVC compound qualified.

Novel CPVC Pipe—¾" (19 mm) CTS, SDR-11

A first specific CPVC compound for extruding this novel pipe is formulated as follows:

100 parts by weight of CPVC with a Cl content of 67.3 wt. % derived from PVC having an inherent viscosity of 0.92, are combined with 2 parts of the CPE; 6 parts of Blendex® 338 impact modifier; 2.4 parts organotin stabilizer; 0.25 parts hindered phenol and 4 parts titania having a submicron particle size; and 2.0 parts lubricant specified above, in a Henschel mixer, then extruded in a twin-screw extruder.

A plaque of the first CPVC compound has a notched Izod impact strength (ASTM D256) of at least 5 ft.lb/in (266.9 J/m) of notch; tensile strength (ASTM-D638) of at least 7,000 psi; modulus of elasticity of at least 2,482 MPa (360,000 psi); HDT (ASTM-D648) under 264 psi (1.82 MPa) load of at least 110° C. after annealing; and the CPVC compound passes the performance requirement of ASTM D-1784 for cell class 2-4-4-4-8.

In Table 7, the "Test Compound" identifies the batch of the compound tested, by its code. Multiple batches were compounded using the identical recipe to obtain a reliable HDB value for the pipe tested. Each batch of HT-10092 and HT-10857-1 is formulated with the same ingredients as given above for the novel compound (6 phr of Blendex 338 in particular) which met all requirements of cell class 2-4-4-4-8. The "Time" is the actual number of hours a sample was tested before failing. The "psi" value at the 100,000 hr intercept is the extrapolated burst strength, defined by the hydrostatic design basis (HDB).

TABLE 7

| Test compound | Time, hr | 100,000 hr intercept, psi |
|---|---|---|
| HT-10847-1 | 13,800 | 1272 |
| HT-10092 | 3576 | 1333 |

CPVC Pipe from Example 7, '497 Patent—¾" (19 mm) CTS, SDR-11:

A second CPVC compound duplicated as specified in Ex. 7 of the '497 patent to provide the extruded pipe is formulated as follows:

100 parts by weight of CPVC with a Cl content of 68.5 wt. % derived from PVC having an inherent viscosity of 0.90, are combined with 2 parts of CPE and 7 parts of Blendex 338 (now found to be most effective); 2.2 parts PE and PEO; 2.4 parts organotin stabilizer (see '497 col. 7, line 47); 2.0 parts of the same lubricant used to make the first CPVC compound; and 5 parts titania (in the same submicron size range specified to make the first CPVC compound, though the size range is not specified in the '497 patent); and blended in a Henschel mixer and extruded in a twin-screw extruder.

A plaque of the second CPVC compound has a notched Izod impact strength (ASTM D256) of 7.7 ft.lb/in (411 J/m) of notch; tensile strength (ASTM-D638) of 7,997 psi; modulus of elasticity at least 363,500 psi; HDT (ASTM-D648) under 264 psi (1.82 MPa) load of at least 111° C. without annealing. The pipe made from the second CPVC compound passes the performance requirement of ASTM D-1784 for cell class 2-4-4-4-7.

A portion of the extruded pipe was tested over a period of 600 hr. The "psi" value at the 100,000 hr intercept is the extrapolated burst strength, defined by the hydrostatic design basis (HDB).

TABLE 8

| Test compound | Time, hr | 100,000 hr intercept, MPa (psi) |
|---|---|---|
| '497 patent | 600 | 8.66 (1242) |

One skilled in the art knows that the 100,000 hr intercept, estimated after 600 hr decreases as time progresses past 600 hrs. Upon continued testing of the pipe, the intercept would go below the 1200 psi requirement for ASTM D2837. Much like the SDR rating described above, the standards in ASTM D2837 for HDB is not an exact number. LTHS values of 1000 psi are in a range of 960 to 1190 psi and for 1250 psi the range is from 1200 to 1520 psi. Therefore, in this specification and claims a HDB of 1250 psi means it is within the range of 1200 to 1520 psi as according to ASTM D2837.

A Third CPVC Pipe is Extruded Using an MBS Graft Copolymer from Example 5, of the '497 Patent—2.54 cm (1") Nominal Diameter, SDR-11:

The compound for Example 5 is formulated with the same ingredients as in Ex. 7 except that Ex. 5 uses 7 parts of an MBS graft copolymer impact modifier instead of using the Blendex 338 graft copolymer (used in the above duplication of the same example in the '497 patent because it is now found that the Blendex 338 is one of the most effective impact modifiers).

Though the notched Izod impact strength is excellent (441 J/m of notch, or 7.7 ft.lbs/in of notch), the Ex. 5 pipe is stated to have failed to meet the HDT requirement of 101° C.

In contrast, with 6 phr of an MBS graft copolymer believed to be the same as one used in Ex. 5, and the other ingredients as specified in the novel CPVC compound, the extruded pipe meets the HDT requirement, as well as all others for cell class 2-4-4-4-8. In addition, it meets the HDB of at least 1250 psi at the 100,000 hr intercept.

The following Table 9 sets forth the composition of the compound used to extrude pipe which was tested after 2650 hr and 7493 hr. Though the test period is short of a more desirable 10,000 hr, since it is the best currently available and several-fold longer than the test period used in the '497 patent, the expected HDB derived from an extrapolation of the data from the shorter test period is set forth in Table 10.

TABLE 9

| MBS Graft Copolymer | |
|---|---|
| Ingredient | 2198007060702B |
| CPVC Resin (0.92 IV, 67.3 wt. % Cl) | 100 |
| Tin Stabilizer | 2.4 |
| Anti-Oxidant | 0.25 |
| MBS Impact Modifier | 6 |
| Chlorinated Polyethylene | 2 |
| Titanium Dioxide | 4 |
| Carbon Black | 0.16 |
| Lubricant | 2 |
| Notched Izod Impact - ASTM D256 (ft-lb/in) | 8.2 |
| Tensile Strength - ASTM D638 (Psi) | 7456 |
| Modulus of Elasticity - ASTM D638 (Psi) | 384600 |

TABLE 10

| Test compound | Time, hr | 100,000 hr intercept, psi |
|---|---|---|
| HT-11016-2B | 2650 | 1286 |
|  | 7493 | 1250 |

The effect of the amount of submicron titania in the size set forth above, used in the compound has a relatively minor effect on tensile strength, HDT and modulus of elasticity, but a large effect on impact strength, as evidenced by the data set forth in Table 11 below.

TABLE 11

Effect of Concentration of Titanium Dioxide on CPVC

| Ingredient | 2198007061201 | 2198007061202 | 2198007061204 |
|---|---|---|---|
| CPVC Resin (0.92 IV, 67.3 wt. % Cl) | 100 | 100 | 100 |
| Tin Stabilizer | 2.4 | 2.4 | 2.4 |
| Anti-Oxidant | 0.25 | 0.25 | 0.25 |
| Impact Modifier | 6 | 6 | 6 |
| Chlorinated Polyethylene | 2 | 2 | 2 |
| Titanium Dioxide | 0 | 1 | 4 |
| Carbon Black | 0.16 | 0.16 | 0.16 |
| Lubricant | 2 | 2 | 2 |
| Notched Izod Impact - ASTM D256 (ft-lb/in) | 4.7 | 7.3 | 10.2 |
| Tensile Strength - ASTM D638 (Psi) | 8086 | 8126 | 7956 |
| Modulus of Elasticity - ASTM D638 (Psi) | 382000 | 365000 | 375000 |
| HDT (Annealed 24 hrs@ 100° C.) - ASTM D648 (° C.) | 111 | 111 | 111 |

Although this specification has concentrated on SDR-11 and SDR-13.5 pipes, it is recognized that other SDR rating pipes can be made with the CPVC composition of this invention. These include, but not limited to, SDR-7, SDR-9, SDR-11, SDR-13.5, SDR-17, SDR-21, SDR-26 and SDR-32.5. Also, schedule 40 and schedule 80 pipes (IPS sizes) can be produced with the CPVC composition of this invention.

The novel pipes made according to this specification can be used in a piping system for residential, commercial, or industrial plumbing systems. Multiple lengths of pipe can be assembled together with multiple pipe fittings. The most preferred method to attach the pipe with fittings is by use of an adhesive, such as a solvent cement. For the CPVC pipes, the solvent cement would contain CPVC resin.

Having thus provided a general discussion of the novel pipe made with the novel CPVC compound, both described in detail, and having illustrated the pipe and compound with specific illustrations of the best mode of making and using them, it will be evident that the novel pipe has provided an effective solution to a difficult problem. It is therefore to be understood that no undue restrictions are to be imposed by reason of the specific embodiments illustrated and discussed, and particularly that the novel pipe is not restricted to a slavish adherence to the details set forth herein.

What is claimed is:

1. A CPVC pipe having a standard dimension ratio of 13.5 which is made with a CPVC composition meeting a hydrostatic design basis (HDB) of at least 1250 psi at the 100,000 hr intercept, as measured according to ASTM-D2837-01 at 180° F., wherein the pipe is of a cell class of at least 2-4-4-4-7 and has a pressure rating of at least 100 psig as calculated using a safety factor of 0.5 and wherein the CPVC composition is comprised of (a) 100 parts by weight of a CPVC resin, wherein the CPVC resin has a chlorine content which is within the range of 66.5 percent to 70 percent by weight and made from PVC having an inherent viscosity of at least 0.88; (b) about 5 to about 6 parts by weight of an impact modifier which is a graft copolymer having a polydiene rubber backbone with styrene, acrylonitrile, and/or an acrylate monomer grafted to the polydiene rubber backbone; (c) about 1 to about 7 parts by weight of an inert filler, (d) about 1.3 to about 3.5 parts by weight of a lubricant; (e) about 1.25 to about 3 parts by weight of an organotin stabilizer, and (f) from about 1.5 to about 3 parts by weight of a chlorinated polyethylene.

2. The CPVC pipe of claim 1 wherein the pipe is of cell class 2-4-4-4-8.

3. The CPVC pipe of claim 1 wherein the pipe is a plumbing pipe for hot and cold water applications.

4. The CPVC pipe of claim 1 wherein the pipe is comprised of at least 80 weight percent CPVC resin.

5. The CPVC pipe of claim 1 wherein the pipe is comprised of at least 85 weight percent CPVC resin.

6. The CPVC pipe of claim 1 wherein the pipe is comprised of at least 86 weight percent CPVC resin.

7. The CPVC pipe of claim 1 wherein the CPVC composition has a notched Izod impact strength of at least 5.0 ft. lb/in (266.9 J/m) of notch.

8. The CPVC pipe of claim 7 wherein the chlorinated polyethylene has a chlorine content which is within the range of about 32 weight percent to about 40 weight percent and a weight average molecular weight which is within the range of 120,000 to 400,000 Daltons.

9. The CPVC pipe of claim 8 wherein the CPVC composition is further comprised of about 0.1 to about 1 part by weight of an antioxidant.

10. The CPVC pipe of claim 9 wherein the CPVC composition exhibits a tensile strength of at least 7,000 psi (48.3 MPa), a modulus of elasticity of at least 360,000 psi (2,482 MPa), and a heat deflection temperature (HDT) under a 264 psi (1.82 MPa) load of at least 100° C. without being annealed.

11. The CPVC pipe of claim 7 wherein said impact modifier is a graft copolymer having a polybutadiene rubber backbone with styrene and acrylonitrile grafted to said backbone.

12. The CPVC pipe of claim 7 wherein said impact modifier is a graft copolymer having a polybutadiene rubber backbone with methylmethacrylate and styrene grafted to said backbone.

13. The CPVC pipe of claim 7 wherein said impact modifier is a graft copolymer having a styrene-butadiene rubber backbone with methyl methacrylate and styrene grafted to said backbone.

14. The CPVC pipe of claim 7 wherein the filler is selected from the group consisting of carbon black and titanium dioxide, wherein the filler has a primary particle size which is within the range of about 0.01 μm to 3 μm with about 90 percent of the particles being in the particle size range of about 0.01 μm to 2 μm.

15. a piping system which is comprised of multiple lengths of the CPVC pipe of claim 1 and multiple CPVC pipe fittings.

16. the piping system of claim 15 wherein said CPVC pipe and said CPVC pipe fittings are joined together by an adhesive.

17. the piping system of claim 16 wherein said adhesive is a solvent cement adhesive comprising CPVC resin.

* * * * *